J. C. MANTERNACH.
VEHICLE WHEEL WITH DEMOUNTABLE RIM.
APPLICATION FILED APR. 10, 1916.
1,336,531. Patented Apr. 13, 1920.
2 SHEETS—SHEET 1.
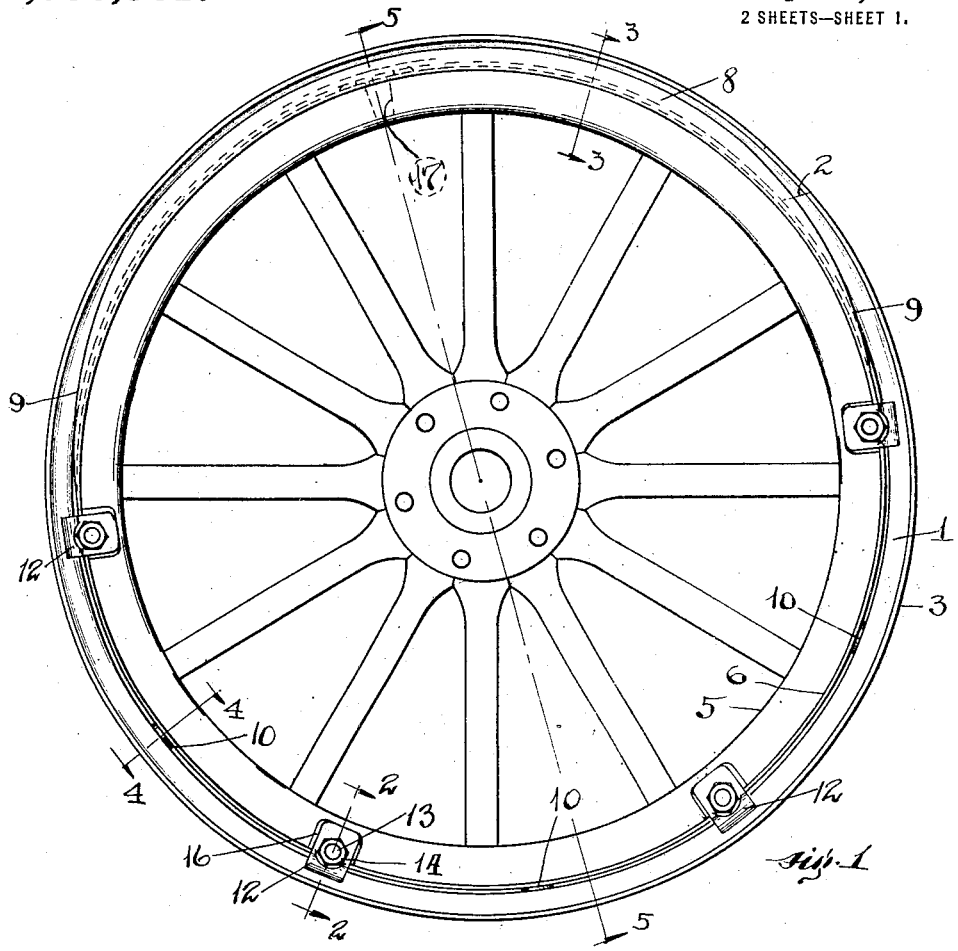
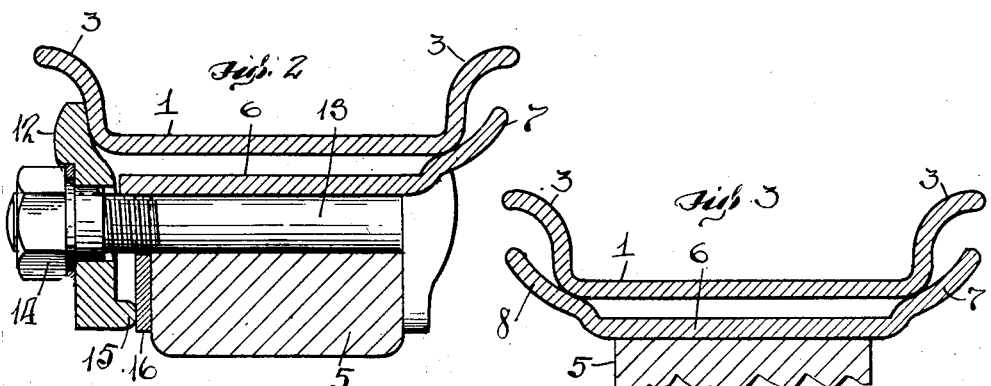
WITNESSES:
O. McKappler
Thos. H. Fay
INVENTOR
John C. Manternach
BY Fay, Oberlin & Fay
ATTORNEYS

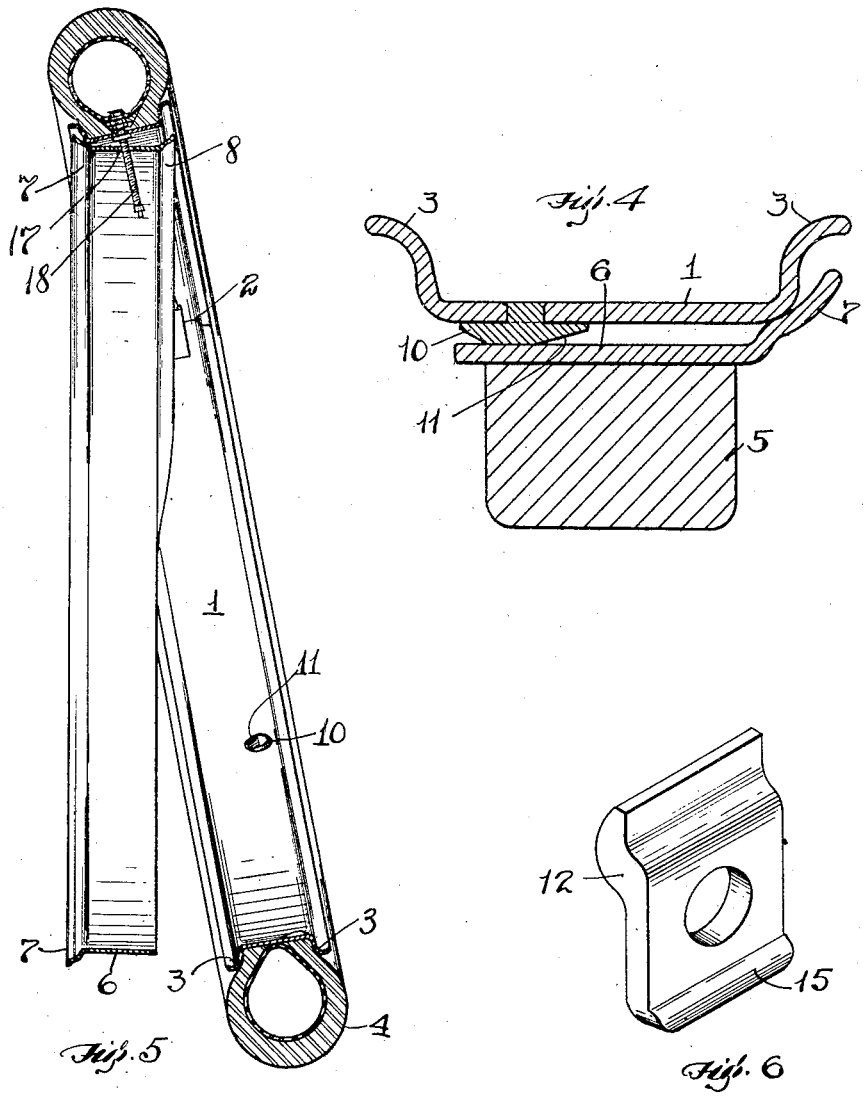

UNITED STATES PATENT OFFICE.

JOHN C. MANTERNACH, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-WHEEL WITH DEMOUNTABLE RIM.

1,336,531.      Specification of Letters Patent.      Patented Apr. 13, 1920.

Application filed April 10, 1916. Serial No. 90,031.

*To all whom it may concern:*

Be it known that I, JOHN C. MANTERNACH, a citizen of the United States, and a resident of Cleveland, county of Cuyahoga, and State of Ohio, have invented a new and useful Improvement in Vehicle-Wheels with Demountable Rims, of which the following is a specification, the principle of the invention being herein explained and the best mode in which I have contemplated applying that principle, so as to distinguish it from other inventions.

The object of the present invention is to provide a vehicle wheel with a demountable rim, such as is regularly used for supporting tires in connection with vehicle wheels, more especially with automobile wheels, which may be secured in place and taken off again by the operation of a minimum number of parts. A further object is to avoid the use of separate movable wedges of any kind for securing the rim in place on the wheel. To the accomplishment of the foregoing and related ends, the invention, then, consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

In said annexed drawings:—

Figure 1 is a side elevation of a wheel provided with a demountable rim shown as secured in place with my improved locking means; Figs. 2, 3 and 4 are transverse sections of such wheel and rim taken on planes indicated by the lines 2—2, 3—3 and 4—4 respectively, Fig. 1; and Fig. 5 is another transverse section of the wheel and rim, taken on the plane indicated by the line 5—5, Fig. 1, the felly-band being the only part of the wheel that appears, and the rim being shown in partially removed position. Fig. 6 is a perspective view of one of the clamping plates.

The rim illustrated in the several figures of the drawings, is similar to what is currently known as the Continental type of rim, being further shown as trans-split at one point 2 in its circumference, to facilitate the placing of the tire-shoe thereon, or its removal therefrom. It is immaterial, however, whether the rim be thus trans-split, or continuous, or whether it be otherwise of sectional construction so far as the present invention is concerned.

It is also, of course, immaterial whether the side-flanges 3 of such rim be of the straight-side type illustrated, adapting the rim to receive a so-called straight side tire 4, or whether such side-flanges be of the clencher type, adapting the rim to receive the corresponding type of tire. In general, the wheel body is likewise of familiar construction, including the usual felly 5 and felly-band 6 surrounding the same. Moreover, as in the case where such wheel body is designed to receive the current type of Continental rim, said felly-band is provided on its inner edge with a transversely beveled, outwardly inclined flange 7, the corresponding side of the rim being formed to seat upon said flange when in place on the wheel-body, substantially about its entire circumference.

Instead, however, of interposing a series of movable wedges between the other side of said rim and the outer edge of the felly-band, as in such Continental construction, I provide special and much more simple means. These comprise in the first place, a second flange 8 located on such front edge of the felly-band, similar to the one just described as being formed on its rear edge. Such front flange, however, as best indicated in Fig. 1, extends for only a portion of the circumference of the wheel, approximately one-third of such circumference as shown. The ends 9 of this flange preferably do not terminate abruptly, but gradually merge with the body of the felly-band, so that such flange, together with the adjacent section of the rear flange, provide in effect a "cradle," in which the corresponding portion of the rim can be seated, the respective sides of the rim contacting with the respective flanges in the fully seated condition of said rim, as shown in Fig. 3. Preferably, one-half of the entire circumference of the rim will be thus supported.

The remaining portion of the rim is then provided with a plurality of spaced supporting lugs 10, three in the form illustrated, which are adapted to rest in close fitting contact with the felly-band when the rim is thus in place on the latter. These lugs, in fact, are preferably formed with their inner faces 11 on a slight bevel, so that the rim is put under a certain degree of tension as they ride up onto the felly-band, and then rest thereon in their final operative position, as shown in Fig. 4.

For thus forcing the portion of the rim that is thus fitted with these spaced supporting lugs, into final lateral position, a series of lateral clamping plates 12, four as shown (see Fig. 1), are utilized. As indicated in Fig. 2, showing one of these clamping plates in cross section, they merely contact with the side of the rim, and exert a lateral thrust thereon only, being mounted on transversely disposed bolts 13 in the felly of the wheel, which in turn have nuts 14 threaded on their outer ends for thus drawing said clamps up. The inner ends of the latter, as shown in said Fig. 2, and again in Fig. 6, are formed with rounded ribs 15, which press against bearing plates 16 attached to the side of the felly, and constitute, in effect, a part of the wheel body, such ribs forming fulcra for the plates, and increasing the force exerted by the nuts in pressing their outer ends against the side of the rim.

The manner in which the rim is placed in position on the wheel body, or removed therefrom, as the case may be, is illustrated in Fig. 5, where, of such wheel-body, the felly-band 6 only is shown. It will be observed, as also shown in Fig. 1, that the valve stem opening 17 in the felly-band and felly, is located approximately at a point midway between the ends of the flange 8 on the front edge of the felly-band. The rim, with the tire supported thereon, is accordingly located circumferentially upon the wheel body, preliminarily to being placed thereon, by inserting the valve stem 18 through the opening thus provided, as shown in said Fig. 5. This also brings the adjacent portion of the rear side of said rim into approximate seating position on the rear flange of the felly-band. As the opposite side of the rim (the lower side in the figure in question) is then swung to the right in said figure, the front side thereof (at the top of said figure) is brought down into the position shown in effect in Fig. 3, and fully seats upon the front flange of said felly-band by the time that the rear side of the rim contacts all the way around with the rear flange.

During this swinging movement, the spaced supporting lugs 10 ride up onto the felly-band, and place the rim under more or less tension, as already explained. The clamping plates 12 are now applied to the respective bolts 13, and the nuts 14 tightened up on the latter, so as to force the rim over against the corresponding portion of the rear flange, with the result that the rim firmly seats between such rear flange and the front flange, throughout their common extent, and also firmly seats against such rear flange throughout the remainder of its extent.

In order to remove the rim, the clamps 12 are first loosened, and either turned out of the way, or entirely removed, so as to leave the corresponding portion of the rim free to be swung outwardly in a direction the reverse of that just described, namely to the right in Fig. 5, whereupon the rim may be lifted entirely free from the wheel body, as will be readily understood.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

The combination with a wheel body having a transversely beveled, outwardly inclined flange adjacent its inner edge and extending substantially entirely around the same, and a similar oppositely inclined flange adjacent its outer edge extending around a portion of the circumference of said wheel body only and gradually merging with said wheel body; of a demountable rim for said wheel body adapted to be swung into seating position between said flanges throughout their common extent; and means adapted to retain said rim in such position, said means including spaced supporting lugs on the inner face of the portion of said rim that is clear of such last-named flange, bearing plates on the sides of the felly and clamps adapted to laterally engage such portion of said rim and press the same into full engagement with the other flange, said clamps being provided with ribs on their inner faces adapted to press against said plate and act as fulcra to increase the pressure exerted by said clamps against said rim.

Signed by me, this 6th day of April, 1916.

JOHN C. MANTERNACH.

Attested by—
  M. H. WILLIAMS,
  R. C. COOLEY.